United States Patent
Wada et al.

(10) Patent No.: US 7,327,536 B2
(45) Date of Patent: Feb. 5, 2008

(54) SUSPENSION WITH INTEGRALLY FORMED LOAD BEAM LOAD-GENERATION MEMBER

(75) Inventors: Takeshi Wada, Tokyo (JP); Takashi Honda, Tokyo (JP)

(73) Assignee: TDK Corporation, Tokyo (JP)

( * ) Notice: Subject to any disclaimer, the term of this patent is extended or adjusted under 35 U.S.C. 154(b) by 317 days.

(21) Appl. No.: 10/671,587

(22) Filed: Sep. 29, 2003

(65) Prior Publication Data

US 2004/0070882 A1 Apr. 15, 2004

(30) Foreign Application Priority Data

Oct. 11, 2002 (JP) .............................. 2002-299217

(51) Int. Cl.
*G11B 21/16* (2006.01)
*G11B 5/48* (2006.01)

(52) U.S. Cl. ................................. 360/244.5; 360/244.8

(58) Field of Classification Search ............ 360/265.9, 360/244.2, 244.5, 244.6, 244.7, 244.8, 245.2
See application file for complete search history.

(56) References Cited

U.S. PATENT DOCUMENTS 5,065,268 A * 11/1991 Hagen ..................... 360/244.8
5,408,372 A * 4/1995 Karam, II ................ 360/244.2
5,657,187 A * 8/1997 Hatch et al. .............. 360/244.8
5,898,543 A * 4/1999 Jagt et al. ................ 360/244.8
5,999,369 A * 12/1999 Shimizu et al. ........... 360/244.5
2004/0001287 A1* 1/2004 Honda et al. ............. 360/244.2
2004/0057159 A1* 3/2004 Kuwajima et al. ....... 360/244.2
2004/0090710 A1* 5/2004 Honda et al. ............. 360/244.8

FOREIGN PATENT DOCUMENTS

JP 5-8770 2/1993
JP 09082052 A * 3/1997
JP 2002-237160 8/2002

* cited by examiner

*Primary Examiner*—Craig A. Renner
(74) *Attorney, Agent, or Firm*—Oblon, Spivak, McClelland, Maier & Neustadt, P.C.

(57) ABSTRACT

An HGA includes a head slider having at least one head element, a resilient flexure for supporting the head slider to control flying attitude of the head slider, a load beam, supporting the flexure at its top end section, for applying a load in a direction perpendicular to a surface of a recording medium to the head slider, at least one fixing part, formed integral with the load beam, for fixing the load beam to a support arm, and a load-generation part, coupling the at least one fixing part with the load beam, for generating the load. The load-generation part has first at least one leaf spring section formed in a three-dimensionally bent shape and integral with the load beam, the first at least one leaf spring section being located at the rear of the at least one fixing part.

18 Claims, 8 Drawing Sheets

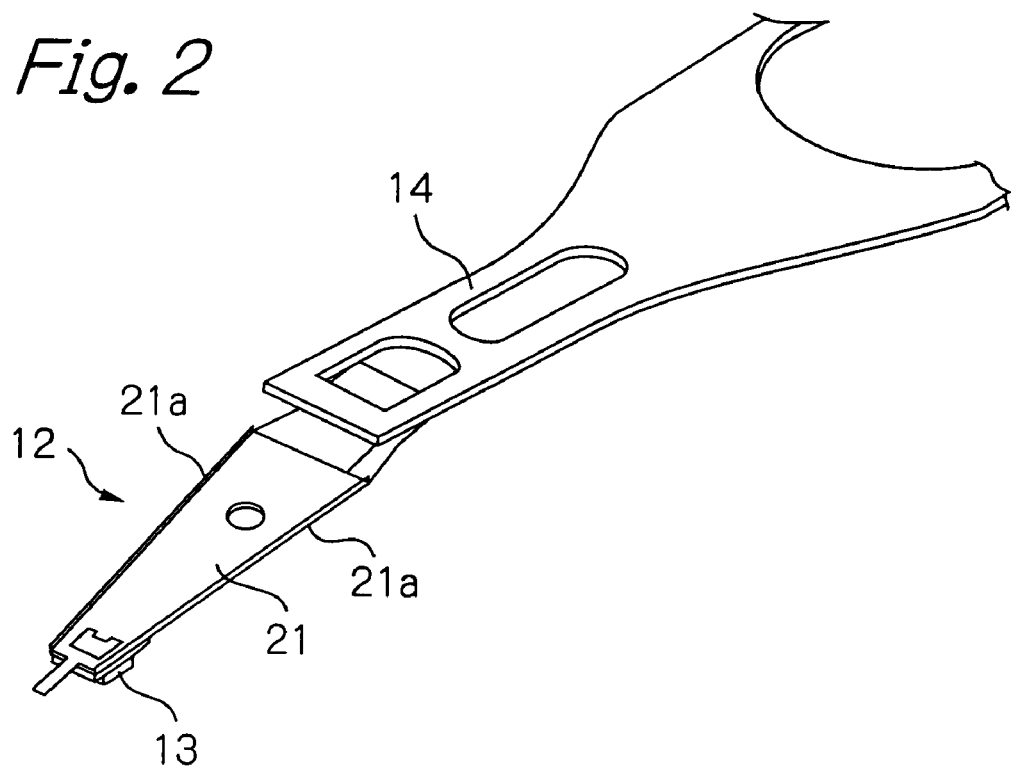
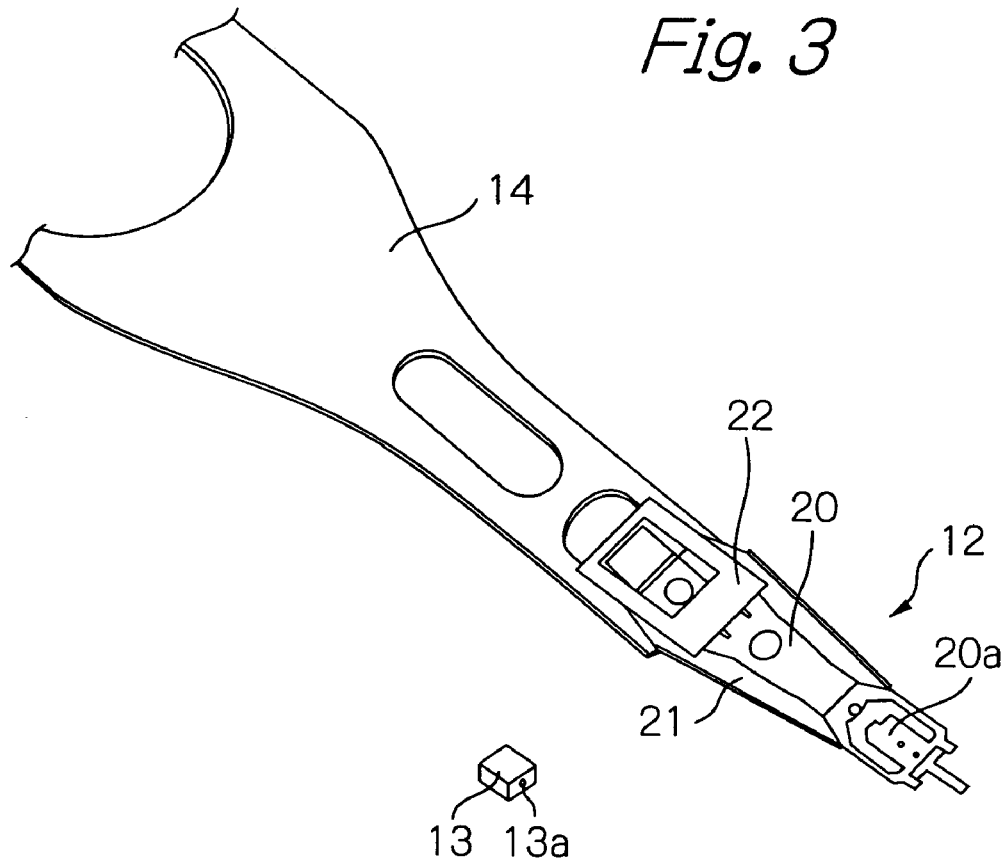

SUSPENSION WITH INTEGRALLY FORMED LOAD BEAM LOAD-GENERATION MEMBER

FIELD OF THE INVENTION

The present invention relates to a suspension for supporting a recording and/or reproducing head such as a flying type thin-film magnetic head or a flying type optical head, to a head gimbal assembly (HGA), to a head arm assembly (HAA) with the HGA, and to a disk drive device with the HAA.

DESCRIPTION OF THE RELATED ART

In a magnetic disk drive device, a thin-film magnetic head for writing magnetic information into and/or reading magnetic information from a magnetic disk is in general formed on a magnetic head slider flying in operation above a rotating magnetic disk. The slider is fixed at a top end section of an HGA.

The HGA has in general a magnetic head slider, a resilient flexure for supporting the magnetic head slider, a load beam with a low rigidity for supporting the flexure at its top end section, and a base plate for supporting a rear end section of the load beam. A load applied to the magnetic head slider in a direction to the magnetic disc surface is generated by a plate spring provided at a middle section of the load beam.

Such conventional HGA has a cantilever beam structure for supporting the load beam at the rear end section of the load beam. This cantilever beam structure outperforms in stable load application to the magnetic head slider and space savings, but has a large disadvantage of poor impact resistance. That is, because of the magnetic head slider mounted at the top end section or a free end section of the cantilever beam structure, a turning moment due to the magnetic head slider will be added to an original turning moment based on the weight of the whole system of this cantilever beam structure when an impact is applied from outside. This addition of the turning moment may produce a slapping mode of the HGA, such as popping up of the HGA from the magnetic disc surface or hurling of the HGA to the magnetic disc surface. Particularly, since the conventional HGA uses a low rigidity spring material such as a stainless steel plate slightly thicker than that of the flexure as for the load beam that constitutes a main beam structure for supporting the magnetic head slider, this tendency due to poor impact resistance becomes more pronounced.

With respect to a 3.5-inch magnetic disk drive device mounted in a high-end or disk-top computer, an excessively large impact is hardly applied. However, with respect to a 2.5-inch magnetic disk drive device mounted in a notebook computer, an excessively large impact may be sometimes applied. Thus, the above-mentioned poor impact resistance of the HGA becomes large problem.

In order to improve the impact resistance performance of the HGA, a head support member having an arm member with high rigidity, a magnetic head slider mounted to one end section of the arm member and a voice coil motor (VCM) mounted to the other end section of the arm member for horizontally rotationally moving the arm member has been proposed in Japanese patent publication 2002237160A for example. The arm member can be rotationally moved around a bearing in a radius direction of the magnetic disk and also in a direction orthogonal to the surface of the magnetic disk. A load is applied to the magnetic head slider by energizing a leaf spring section by means of pivots.

Such head support member with the arm member rotationally moving in balance around the bearing can be adopted without inviting any problem to a magnetic disk drive device if the drive device has an extremely small diameter disk. However, in case of a magnetic disk drive device with a larger diameter disk than that, such as a 1.8-inch or 2.5-inch magnetic disk drive device, it is necessary to provide a very long arm or suspension and thus resonance characteristics thereof will be deteriorated to prevent a precise positioning control of the magnetic head slider during the seek operation at all.

In order to resolve such problems, a support arm with a very high rigidity may be designed to partially overhang the disk and the head support member described in Japanese patent publication 2002237160A may be mounted on this support arm. However, according to such structure, the rear end of the head support member pivoted at the bearing to move up-and-down may crash to the magnetic disk surface.

Furthermore, the head support member described in Japanese patent publication 2002237160A has a problem of difficulty in control of the load value applied to the magnetic head slider because of its structure wherein the load applied to the slider is produced by pushing a plane plate spring formed at the bearing by means of pivots.

SUMMARY OF THE INVENTION

It is therefore an object of the present invention to provide a suspension, an HGA, an HAA with the HGA and to a disk drive device with the HAA, which can be used for a large diameter disk without any trouble and can increase impact resistance.

Another object of the present invention is to provide a suspension, an HGA, an HAA with the HGA and to a disk drive device with the HAA, which can easily control a load amount applied to a slider and can increase impact resistance.

According to the present invention, a suspension includes a resilient flexure for supporting a head slider having at least one head element to control flying attitude of the head slider, a load beam, supporting the flexure at its top end section, for applying a load in a direction perpendicular to a surface of a recording medium to the head slider, at least one fixing part, formed integral with the load beam, for fixing the load beam to a support arm, and a load-generation part, coupling the at least one fixing part with the load beam, for generating the load. The load-generation part has first at least one leaf spring section formed in a three-dimensionally bent shape and integral with the load beam, the first at least one leaf spring section being located at the rear of the at least one fixing part.

According to the present invention, also, an HGA includes a head slider having at least one head element, a resilient flexure for supporting the head slider to control flying attitude of the head slider, a load beam, supporting the flexure at its top end section, for applying a load in a direction perpendicular to a surface of a recording medium to the head slider, at least one fixing part, formed integral with the load beam, for fixing the load beam to a support arm, and a load-generation part, coupling the at least one fixing part with the load beam, for generating the load. The load-generation part has first at least one leaf spring section formed in a three-dimensionally bent shape and integral with the load beam, the first at least one leaf spring section being located at the rear of the at least one fixing part.

Furthermore, according to the present invention, an HAA includes a head slider having at least one head element, a resilient flexure for supporting the head slider to control flying attitude of the head slider, a load beam, supporting the flexure at its top end section, for applying a load in a direction perpendicular to a surface of a recording medium to the head slider, at least one fixing part formed integral with the load beam, a load-generation part, coupling the at least one fixing part with the load beam, for generating the load, a high rigid support arm fixed to the at least one fixing part at its top end section for supporting the load beam, and a drive part for rotationally moving the support arm in a direction parallel to the surface of the recording medium. The load-generation part has first at least one leaf spring section formed in a three-dimensionally bent shape and integral with the load beam, the first at least one leaf spring section being located at the rear of the at least one fixing part.

Further, according to the present invention, a disk drive device includes a recording medium and the aforementioned HAA.

In this specification, "rear" or "back" represent a base side or fixing side of the HGA or the support arm, and "front" or "top" represent a head attaching side or free side of the HGA or the support arm.

At least one fixing part is formed integral with the load beam, and a load-generation part for generating the load couples the at least one fixing part with the load beam. Also, first at least one leaf spring section formed in a three-dimensionally bent shape and integral with the load beam is located at the rear of the at least one fixing part. According to this configurations, since the turning moment of the head slider is small, the impact resistance performance can be extremely improved. Further, since the at least one leaf spring section has a three-dimensionally bent shape and is integral with the load beam, the load applied to the head slider can be precisely and extremely easily controlled by adjusting the bending shape of the at least one leaf spring section.

Also, according to the present invention, an HAA includes a head slider having at least one head element, a resilient flexure for supporting the head slider to control flying attitude of the head slider, a load beam, supporting the flexure at its top end section, for applying a load in a direction perpendicular to a surface of a recording medium to the head slider, at least one fixing part formed integral with the load beam, a load-generation part, coupling the at least one fixing part with the load beam, for generating the load, a high rigid support arm fixed to the at least one fixing part at its top end section for supporting the load beam, and a drive part for rotationally moving the support arm in a direction parallel to the surface of the recording medium. The load-generation part has first at least one leaf spring section located at the rear of the at least one fixing part and at the front of a horizontal bearing axis of the support arm, which is driven to rotationally move around the horizontal bearing axis.

Still further, according to the present invention, a disk drive device includes a recording medium and the aforementioned HAA.

The HAA is configured so that the high rigid support arm rotationally moves in parallel with a surface of the recording medium and that the HGA having a load-generation section is fixed to the top end section of the support arm. Therefore, even in case of a disk drive device with a large diameter recoding medium such as a 1.8-inch or 2.5-inch disk drive device, no long arm HGA is necessary and thus resonance characteristics thereof will not be deteriorated to provide a precise positioning control of the head slider during the seek operation. Also, since the rear end section of the HGA is fixed, there occurs no trouble of a collision of the rear end of the HGA with the recording medium surface.

It is preferred that the first at least one leaf spring section and the load beam are unitarily formed by a single plate member, or that the first at least one leaf spring section and the load beam are formed by coupling in integral individual plate members.

It is also preferred that the first at least one leaf spring section is located at the rear of a center of an unsprung mass of the head gimbal assembly except for the head slider.

It is preferred that the first at least one leaf spring section is formed by a single leaf spring section, or a plurality of leaf spring sections.

It is further preferred that the HGA further includes a second at least one leaf spring section, formed at the rear of the first at least one leaf spring section along an axis of the head gimbal assembly, for restraining displacement of a rear end section of the load beam, and that the at least one fixing part includes first at least one fixing part coupled with the first at least one leaf spring section and second at least one fixing part coupled with the second at least one leaf spring section.

In this case, it is preferred that the second at least one leaf spring section is formed in a three-dimensionally bent shape and is integral with the load beam, and that the second at least one leaf spring section is located at the rear of the second at least one fixing part.

Preferably, the first at least one fixing part and the second at least one fixing part are the same fixing part, or different fixing parts located at different positions with each other.

It is preferred that the second at least one leaf spring section is formed by a single leaf spring section, or a plurality of leaf spring sections.

It is also preferred that the at least one head element comprises at least one thin-film magnetic head.

Further objects and advantages of the present invention will be apparent from the following description of the preferred embodiments of the invention as illustrated in the accompanying drawings.

BRIEF DESCRIPTION OF THE DRAWINGS

FIG. 2 is a perspective view seen from above illustrating an HGA attached to a support arm in the embodiment of FIG. 1;

FIG. 3 is an exploded perspective view seen from below illustrating the HGA attached to the support arm in the embodiment of FIG. 1;

DESCRIPTION OF THE PREFERRED EMBODIMENTS

Figure 1:
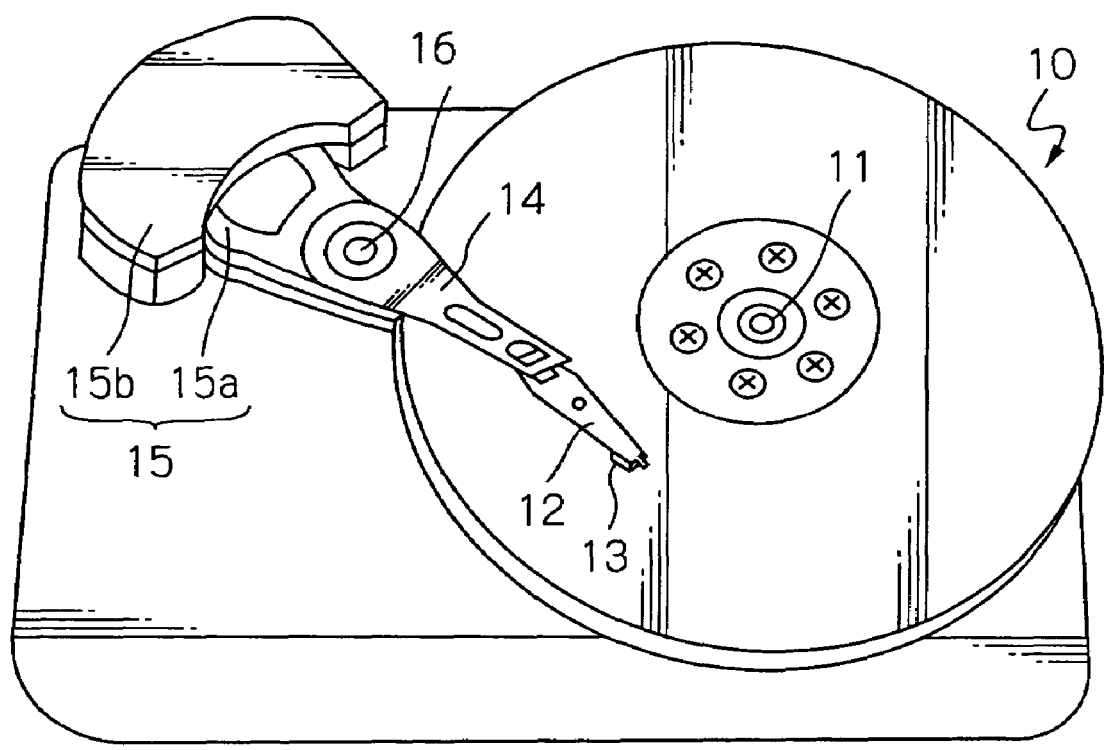
FIG. 1 is a perspective view schematically illustrating main portion of a magnetic disk drive device in a preferred embodiment of the present invention.
Figure 4:
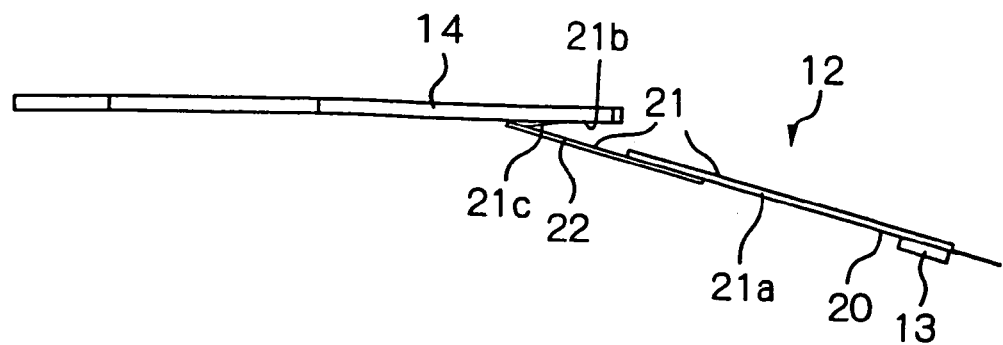
FIG. 4 is a side view illustrating the HGA attached to the support arm in the embodiment of FIG. 1.
Figure 5:
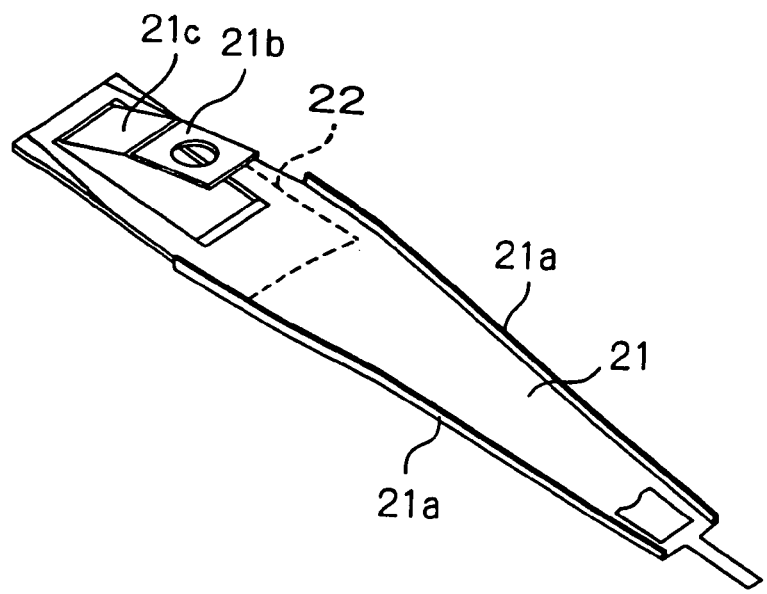
FIG. 5 is a perspective view seen from above illustrating only a load beam and a reinforcing plate of the HGA shown in FIG. 1.

FIG. 1 is a perspective view schematically illustrating a main portion of a magnetic disk drive device in a preferred embodiment of the present invention, FIG. 2 is a perspective view as seen from above (seen from a side opposite to the other side facing to a magnetic disk) illustrating an HGA attached to a support arm in this embodiment, FIG. 3 is an exploded perspective view seen from below (seen from the other side facing to a magnetic disk) illustrating the HGA attached to the support arm, FIG. 4 is a side view seen from a lateral side illustrating the HGA attached to the support arm, and FIG. 5 is a perspective view seen from above illustrating only a load beam and a reinforcing plate of the HGA. It should be noted that in these figures, lead conductor patterns are omitted from illustration.

In FIG. 1, reference numeral 10 denotes a single magnetic hard disk or a plurality of magnetic hard disks rotating around an axis 11, 12 denotes an HGA provided with a magnetic head slider 13 mounted at its top end section, 14 denotes a support arm for supporting and fixing the HGA 12 at its top end section, 15a denotes a coil of an actuator or a VCM 15 attached to a rear end section of the support arm 14, 15b denotes a yoke of the VCM 15, and 16 denotes a bearing housing for rotationally and horizontally moving the support arm 14, respectively.

The VCM 15 rotationally moves a plurality of support arms 14 stacked along the axis of the bearing housing 16 about this axis in parallel with surfaces of the magnetic disk 10, so as to perform seek operations of the magnetic head sliders 13 of the HGAs 12 attached at the top end sections of the respective support arms 14. An HAA in this embodiment is obtained by assembling the HGA 12, the support arm 14 and the VCM 15.

As shown in FIGS. 2 to 5, the HGA 12 has a resilient flexure 20, a load beam 21 with a stiffness higher than that of the flexure 20 for supporting this flexure 20, 22 a reinforcing plate 22 with a high stiffness fixed to a rear end section of the load beam 21 to increase the stiffness of that section, and the magnetic head slider 13 attached to the top end section of the flexure 20.

The flexure 20 is formed by a single resilient metal plate such as a stainless steel plate (for example, SUS304TA) about 25-30 μm thick in this embodiment. The flexure 20 has a elastic tongue part 20a at its top end section, for supporting with flexibility the magnetic head slider 13 to stably control its flying attitude. The whole of this flexure 20 is fixed to the load beam 21.

The load beam 21 is formed by a metal plate having stiffness higher than that of the flexure 20, such as a stainless steel plate (for example, SUS304TA) about 40-60 μm thick. Side ends of the load beam 21 except for the rear end section of the load beam are bent (straight-line bend) to increase the stiffness. In FIGS. 2, 4 and 5, these bent parts are indicated by reference numeral 21a.

At the rear end section of the load beam 21, a fixing part 21b used for fixing this load beam 21, that is, the HGA 12, to the support arm 14, and a leaf spring section 21c for coupling the fixing part 21b with the load beam 21 are unitarily formed with the load beam 21. In other words, the fixing part 21b and the leaf spring section 21c are fabricated by cutting and bending a part of the same single plate member as the load beam 21.

The leaf spring section 21c is formed in a three dimensionally bent shape by bending a part of the rear end section of the load beam 21 toward its frontward so as to come away from the surface of the load beam. Therefore, it should be noted that in this embodiment the leaf spring section 21c is located at the backward position from the fixing part 21b.

The support arm 14 is formed by an extremely rigid member and the fixing part 21b of the load beam 21 is fixed to this support arm 14.

The magnetic head slider 13 has a thin-film magnetic head element 13a (FIG. 3) consisting of a write head element and a magnetoresistive effect (MR) read head element.

On the flexure 20, although it is not shown, trace conductors for the thin-film magnetic head element 13a are formed. These trace conductors may be fabricated by directly forming a resin layer and trace conductors on the surface of the flexure 20, or by adhering a flexible printed circuit (FPC) member having preliminarily formed resin layer and trace conductors, to the surface of the flexure 20.

Figure 6A:
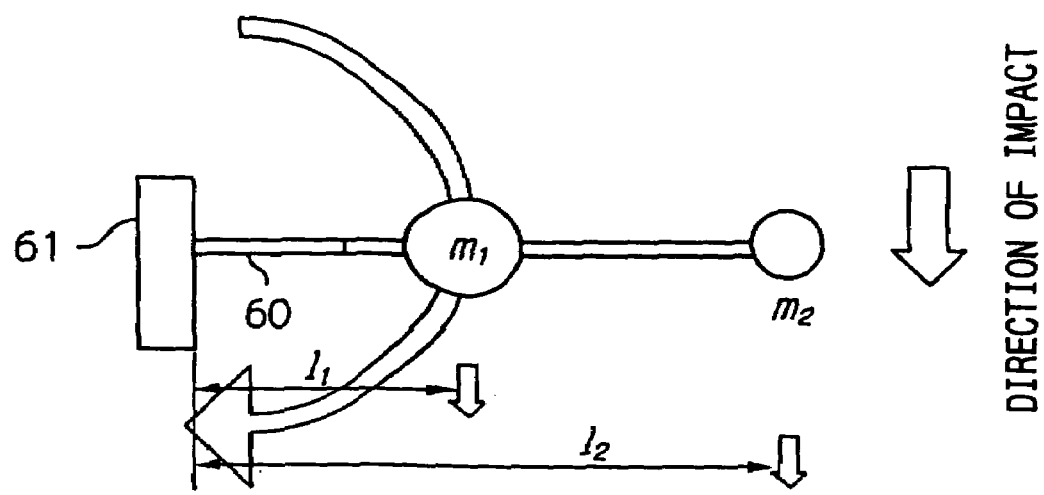
FIGS. 6a and 6b are diagrammatic views illustrating operations of a conventional cantilever beam structure HGA and the HGA shown in FIG. 1.
Figure 6B:
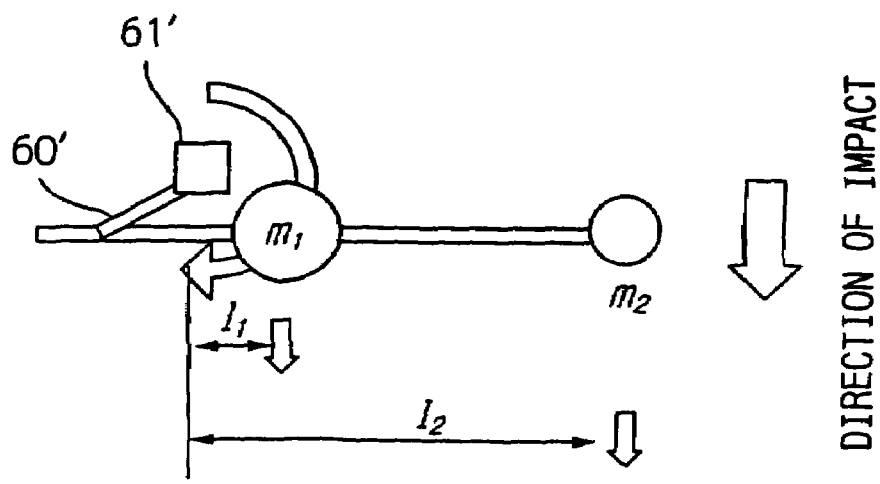

FIGS. 6a and 6b illustrate operations of a conventional cantilever beam structure HGA and the HGA of this embodiment.

To the magnetic head slider of the HGA, in general, a force toward the magnetic disk surface due to the load generated by the leaf spring section is applied. Also, there is a positive force or a lifting force and a negative force or an attraction force generated depending upon the shape of the air bearing surface (ABS) of the magnetic head slider between the magnetic head slider and the rotating magnetic disk. Therefore, if an impact is applied to the HGA from outside, a center of the unsprung mass of the system and the magnetic head slider will individually operate.

FIG. 6a indicates the operation of the conventional UGA, and FIG. 6b indicates the operation of the HGA in this embodiment. In these figures, $m_1$ denotes an unprung mass of the HGA except for the magnetic head slider, and $m_2$ denotes a mass of the magnetic head slider. Also, $l_1$ denotes a distance between the center of the unsprung mass of the HGA except for the magnetic head slider and the fixing member 61, and $l_2$ denotes a distance between the center of the mass of the magnetic head slider and the fixing member 61.

As shown in FIG. 6a, the conventional HGA has a cantilever beam structure, in which one end thereof is connected to a fixing member 61 such as a base plate or a support arm through a support spring member 60 for generating a load such as a leaf or plate spring, and the other end or a free end thereof is connected to the magnetic head slider. According to this structure, when an impact is applied from outside, a large turning moment $m_1 l_1$ is produced at the center of the unsprung mass $m_1$ of the system due to the long distance $l_1$ between the center and the fixing member 61, and the restraint force of the support spring member 60 against the vibration at the top end section of the HGA in a direction of the applied impact is small because it is configured that the load is generated only by the repulsion force of the leaf spring section of this support spring member 60. Also, since the turning moment $m_2 l_2$ produced at the magnetic head slider and the turning moment $m_1 l_1$ produced at the center of the unsprung mass $m_1$ of the system differ with each other, vibrations with different frequencies are mutually interfered and thus it is tough to damp the vibrations.

Contrary to this, as shown in FIG. 6b, the HGA of this embodiment is connected through a support spring member 60' constituted by a leaf spring section folded back from one end of the HGA and bent, to a fixing member 61' at the front of the member 60'. According to this structure, a turning moment $m_1'1_1'$ produced at the center of the unsprung mass $m_1'$ of the system is small due to the short distance $1_1'$ between the center and the fixing member 61'. In addition, since the restraint force of the support spring member 60' against the vibration at the top end section of the HGA is operated in parallel with the applied impact direction because it is configured that the load is generated not only by the deflection force of the leaf spring section of the support spring member 60' but also by the compressed spring force of the support spring member 60' in a perpendicular direction or the impact direction, it is possible to quickly damp the vibrations at the top end section of the HGA. Furthermore, since both the turning moment $m_2 l_2$ produced at the magnetic head slider and the turning moment $m_1 l_1$ produced at the center of the unsprung mass $m_1$ of the system are small, vibrations mutually interfered are small and thus it is easy to damp the vibrations.

In an actual magnetic disk drive device, the support arm displaces in response to the applied impact and therefore the fixing member 60 or 60' itself vibrates at a certain frequency. Thus, the aforementioned differences between the conventional HGA and the HGA according to this embodiment becomes remarkable.

Figure 7A:
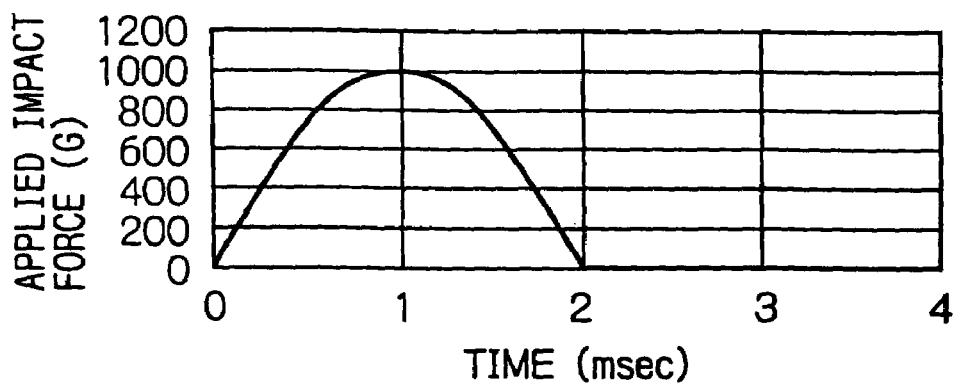
FIGS. 7a to 7c are graphs illustrating simulation results of response characteristics against applied impact with respect to the conventional HGA and the HGA shown in FIG. 1.
Figure 7B:
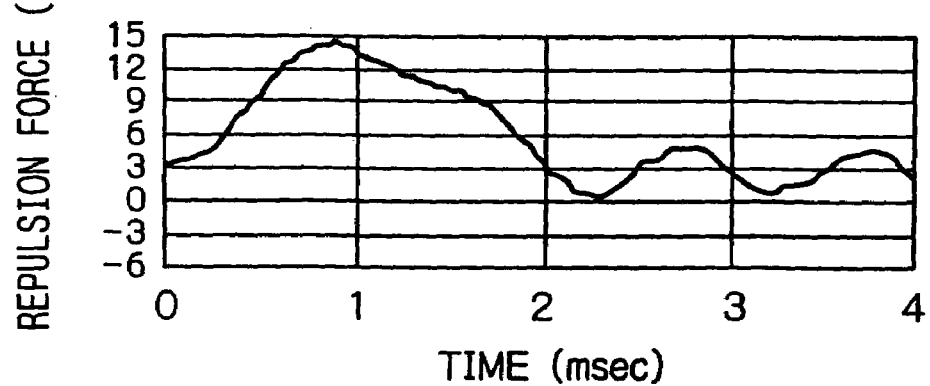
Figure 7C:
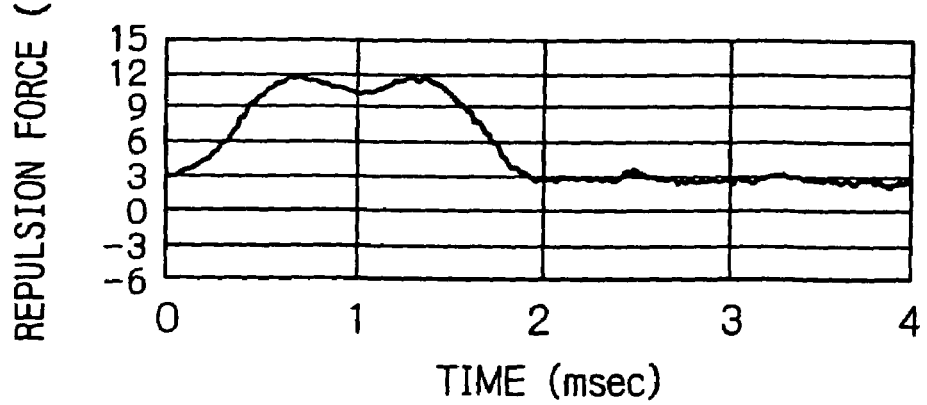

FIGS. 7a to 7c illustrate simulation results of response characteristics against applied impact of sine half wave having a peak level of 1000 G with respect to the conventional HGA and the HGA of the this embodiment. FIG. 7a represents the impact applied, FIG. 7b represents the response characteristics of the conventional HGA, and FIG. 7c represents the response characteristics of the HGA according to this embodiment. Following Table 1 indicates concrete values of this simulations. In Table 1, percentage values indicated in [ ] denote ratios of fluctuations with respect to the initial spring load, namely (Maximum−Initial spring load)/(Initial spring load) or (Initial spring load−Minimum)/(Initial spring load).

TABLE 1

| | Initial spring load | Repulsion force under application of 1000 G (gf) (Before 2 msec. has past) | | Repulsion force under application of 1000 G (gf) (After 2 msec. has past) | |
|---|---|---|---|---|---|
| | (gf) | Maximum | Minimum | Maximum | Minimum |
| Conventional HGA | 2.97 | 14.52 | — | 5.21[75%] | 0.35[88%] |
| HGA of this embodiment | 2.72 | 11.92 | — | 3.60[15%] | 2.07[24%] |

When an impact of 1000 G is applied, fluctuations in the load occur in the conventional HGA and also in the HGA of this embodiment. However, behaviors after the application of impact are extremely different from each other in the conventional HGA and the HGA of this embodiment. As shown in Table 1 and FIG. 7b, after 2 msec. has past from the application of the 1000 G impact, the conventional HGA vibrates with a fluctuation amplitude of about 80% with respect to the initial spring load of 2.97 (gf), namely the maximum repulsion force is 5.21 (gf) and the minimum repulsion force is 0.35 (gf). Contrary to this, as shown in Table 1 and FIG. 7c, after 2 msec. has past from the application of the 1000 G impact, the HGA of this embodiment vibrates within a fluctuation amplitude of about 20% with respect to the initial spring load of 2.72 (gf), namely the maximum repulsion force is 3.60 (gf) and the minimum repulsion force is 2.07 (gf). That is, according to this embodiment, improved damping of the vibrations after the application of impact can be obtained. In other words, the HGA of the embodiment can effectively restrain vibrations at the position of the magnetic head slider in XYZ directions resulting the impact resistance performance to extremely improve.

Also, according to this embodiment, since the leaf spring section 21c has a three-dimensionally bent shape and the load beam 21 and the leaf spring section 21c are unitary, the load applied to the magnetic head slider can be precisely and extremely easily controlled by adjusting the bending shape of the leaf spring section.

According to this embodiment, the HAA is configured so that the extremely high rigid support arm 14 rotationally moves in parallel with a surface of the magnetic disk 10 and that the HGA 12 having a load-generation section is fixed to the top end section of the support arm. More concretely, the leaf spring section that is the load-generation section of the HGA 12 is located at the back of its fixing part but at the front of a horizontal bearing part (bearing housing) for rotationally moving the HGA 12 in a direction parallel with the surface of a magnetic disk. Therefore, even in case of a magnetic disk drive device with a large diameter disk such as a 1.8-inch or 2.5-inch magnetic disk drive device, no long arm HGA is necessary and thus resonance characteristics thereof will not be deteriorated to provide a precise positioning control of the magnetic head slider during the seek operation. Also, since the rear end section of the HGA 12 is fixed, there occurs no trouble of a collision of the rear end of the HGA with the disk surface.

Figure 8:
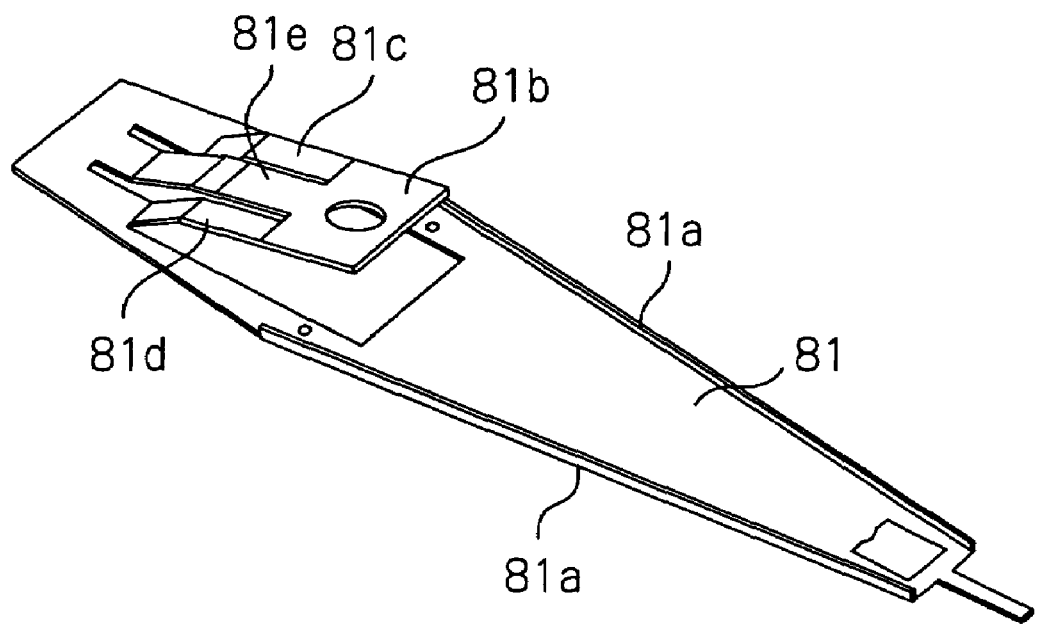
FIG. 8 is a perspective view seen from above illustrating only a load beam in another embodiment of the present invention.

FIG. 8 is a perspective view seen from above illustrating only a load beam in another embodiment.

In this embodiment, the configuration of an HGA except for the load beam is the same as that of the HGA shown in FIG. 1. Therefore, in this embodiment, the same reference numerals are respectively used for the similar elements except for the load beam as these in the embodiment of FIG. 1.

The load beam 81 in this embodiment is formed by a metal plate having stiffness higher than that of the flexure 20, such as a stainless steel plate (for example, SUS304TA) about 40-60 μm thick. Side ends of the load beam 81 except for the rear end section of the load beam are bent (straight-line bend) to increase the stiffness. In FIG. 8, the bent parts are indicated by reference numeral 81a.

At the rear end section of the load beam 81, a single fixing part 81b used for fixing this load beam 81, that is, the HGA 12, to the support arm 14, and three leaf spring sections 81c-81e for coupling the fixing part 81b with the load beam 81 are unitarily formed with the load beam 81. In other words, the single fixing part 81b and the three leaf spring sections 81c-81e are fabricated by cutting and bending a part of the same single plate member as the load beam 81.

The three separated leaf spring sections 81c-81e are formed in a three dimensionally bent shape by individually bending parts of the rear end section of the load beam 81 toward its frontward so as to come away from the surface of the load beam. Therefore, it should be noted that in this embodiment the three leaf spring sections 81c-81e are located at the back of the fixing part 81b.

In this embodiment, the leaf spring sections 81c and 81d are located at different position along the axis of the load beam from the leaf spring section 81e, namely the leaf spring sections 81c and 81d are bent at the front of the leaf spring section 81e. The leaf spring sections 81c and 81d are mainly used to generate the load, and the leaf spring section 81e is used to restrain the displacement of the rear end section of the load beam 81.

Figure 9:
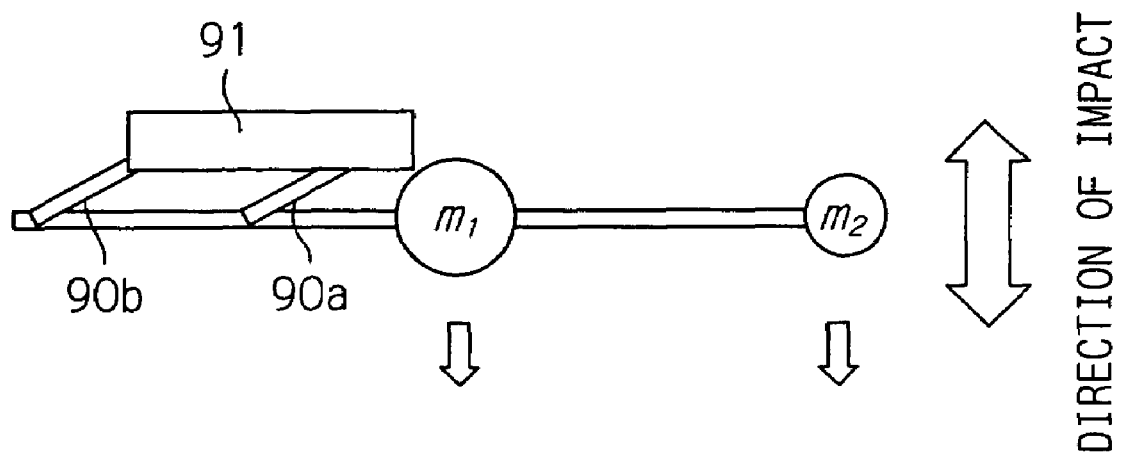
FIG. 9 is a diagrammatic view illustrating operations of an HGA in the embodiment of FIG. 8.

FIG. 9 illustrates operations of the HGA in this embodiment. In the figure, m1 denotes an unsprung mass of the HGA except for the magnetic head slider, and $m_2$ denotes a mass of the magnetic head slider.

As shown in the figure, the HGA of this embodiment is connected, through a support spring member 90a constituted by leaf spring sections folded back from the rear end section of the HGA and bent, and through a lifting spring member 90b constituted by a leaf spring section folded back from the HGA at the rear of the support spring member 90a and bent, to a fixing member 91 at the front of the respective members 90a and 90b. According to this structure, effective advantages of the lifting spring member 90b can be provided in addition to the advantages of the embodiment of FIG. 1. That is, although a turning moment is produced at the center of the unsprung mass m1 of the system when an impact is applied from outside, a turning moment produced at the magnetic head slider is canceled by a repulsion force of the lifting spring member 90b resulting the repulsion forces of the spring members to greatly decrease. According to the simulation result, the repulsion force generated in this embodiment when an impact is applied can be decrease to about 40% of that in the conventional HGA.

Furthermore, the lifting spring member 90b located at the rear end section of the load beam contributes to restrain the displacement of this rear end section of the load beam not only during operations under the normal load but also when an impact is applied.

As aforementioned, since the HGA of this embodiment has a link structure with spring, control of a spring constant and control of vibration amplitude can be easily executed by adjusting the length and/or width of each leaf spring section.

Figure 10:
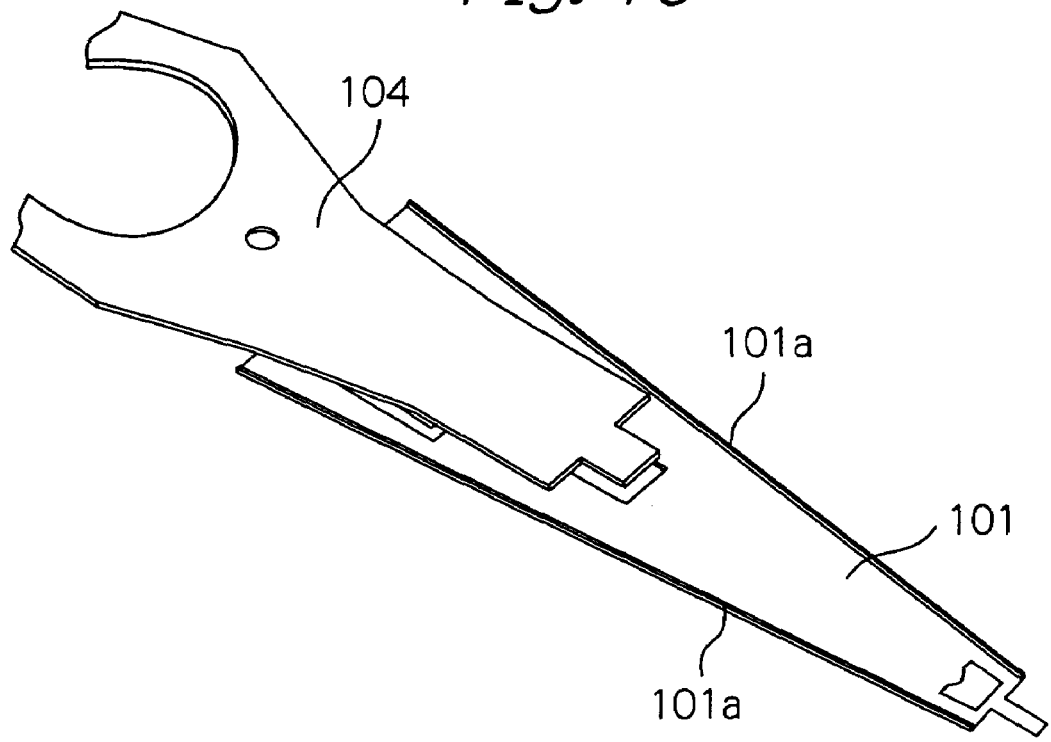
FIG. 10 is a perspective view seen from above illustrating an HGA attached to a support arm in a further embodiment according to the present invention.
Figure 11:
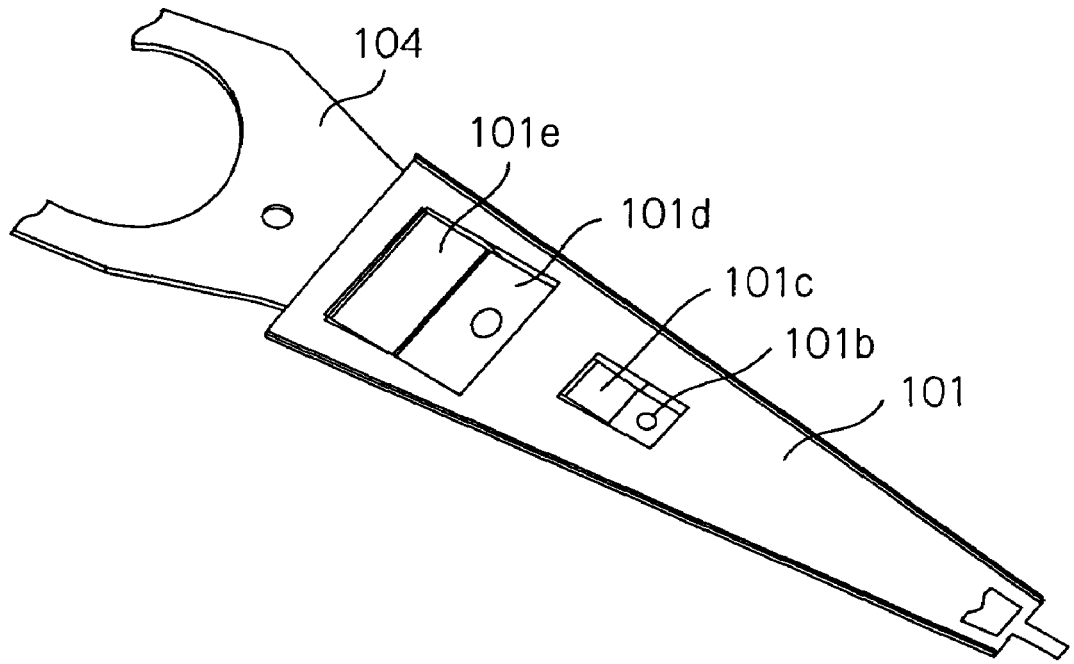
FIG. 11 is an exploded perspective view seen from below illustrating the HGA attached to the support arm in the embodiment of FIG. 10.
Figure 12:
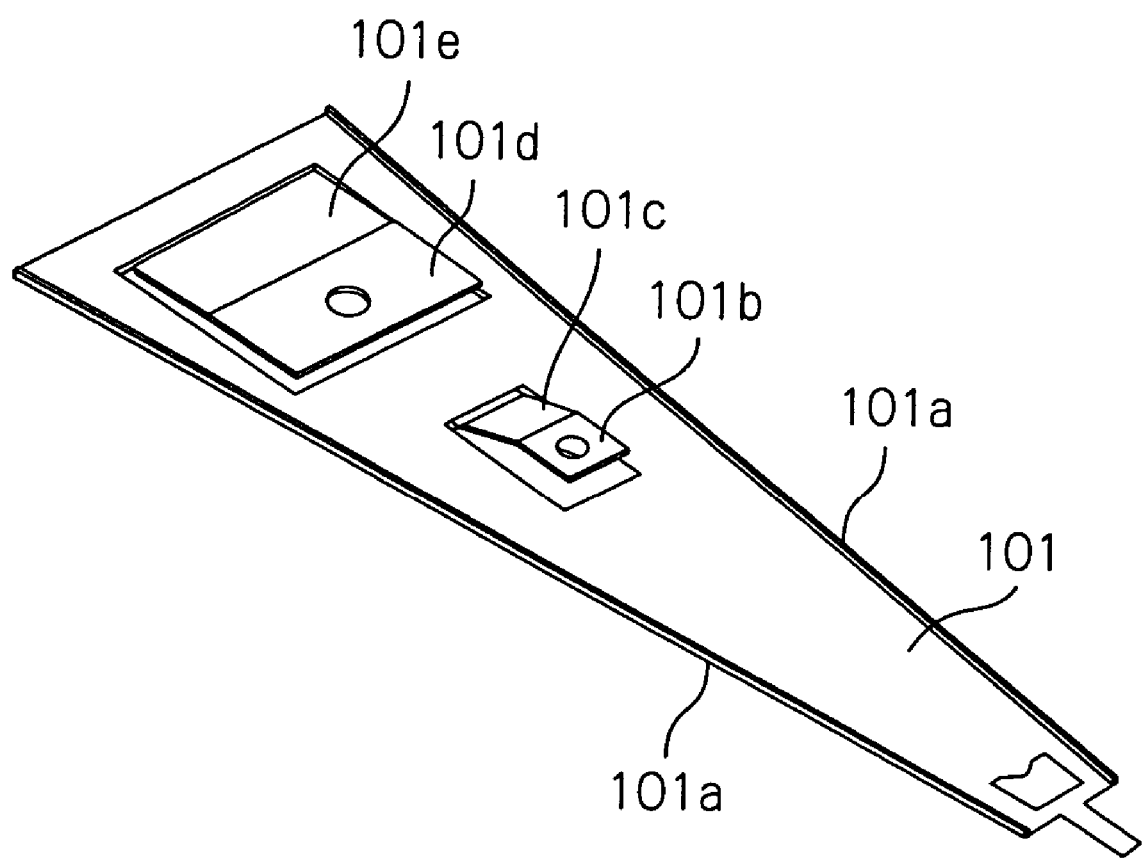
FIG. 12 is a perspective view seen from above illustrating only a load beam of the HGA in the embodiment of FIG. 10.

FIG. 10 is a perspective view seen from above illustrating an HGA attached to a support arm in a further embodiment according to the present invention, FIG. 11 is a perspective view seen from below illustrating the HGA, and FIG. 12 is a perspective view seen from above illustrating only a load beam of the HGA. In these figures, a flexure and a magnetic head slider are omitted from illustration.

In this embodiment, the configuration of an HGA except for the load beam is the same as that of the HGA shown in FIG. 8.

The load beam 101 in this embodiment is formed by a metal plate having stiffness higher than that of the flexure, such as a stainless steel plate (for example, SUS304TA) about 40-60 μm thick. Whole side ends of the load beam 101 are bent (straight-line bend) to increase the stiffness. In FIG. 10, the bent parts are indicated by reference numeral 101a.

At the rear end section of the load beam 101, two fixing parts 101b and 101d used for fixing this load beam 101, that is, the HGA, to the support arm 104 are formed at different positions along the axis of the load beam. Also, at the rear end section of the load beam 101, two leaf spring sections 101c and 101d for coupling the respective fixing parts 101b and 101d with the-load beam 101 are formed. These fixing parts 101b and 101d and these leaf spring sections 101c and 101e are unitarily formed with the load beam 101. In other words, the fixing parts 101b and 101d and the leaf spring sections 101c and 101e are fabricated by cutting and bending a part of the same single plate member as the load beam 101.

The leaf spring sections 101c and 101e are formed in a three dimensionally bent shape by individually bending parts of the rear end section of the load beam 101 toward its frontward so as to come away from the surface of the load beam. Therefore, it should be noted that in this embodiment the leaf spring sections 101c and 101e are located at the back of the respective fixing parts 101b and 101d.

In this embodiment, the leaf spring sections 101c and 101e are located at different position along the axis of the load beam with each other, namely the leaf spring section 101c is bent at the front of the leaf spring section 101e. The leaf spring section 101c is mainly used to generate the load, and the leaf spring section 101e is used to restrain the displacement of the rear end section of the load beam 101.

Another configurations, operations and advantages of this embodiment are substantially similar as these in the embodiment of FIG. 8.

The shapes, number and constructions of the flexure, the load beam and the leaf spring section unitarily formed with the load in the embodiments described above are only examples, and it is obvious that other various modifications can be adopted.

In the aforementioned embodiments and modifications, the load beam and the leaf spring section are unitary, that is, formed from the same single plate member. However, according to the present invention, the load beam and the leaf spring section may be formed from individual plate members and then coupled in integral.

The present invention is explained with use of the HGA including the thin-film magnetic head element, the HAA and the magnetic disk drive device. However, the present invention is not limited only to the HGA, the HAA and the magnetic disk drive device like this, but it is obvious that the present invention is applicable to the HGA including the head element such as, for example, an optical head element other than a thin-film electromagnetic head element, the HAA and the magnetic disk drive device.

Many widely different embodiments of the present invention may be constructed without departing from the spirit and scope of the present invention. It should be under stood that the present invention is not limited to the specific embodiments described in the specification, except as defined in the appended claims.

What is claimed is:

1. A suspension comprising:
   a resilient flexure for supporting a head slider having at least one head element to control flying attitude of said head slider;
   a load beam, supporting said flexure at a top end section thereof, for applying a load in a direction perpendicular to a surface of a recording medium to said head slider;
   at least one fixing means, formed integral with said load beam, for fixing said load beam to a support arm; and
   a load-generation means, coupling said at least one fixing means with said load beam, for generating the load,
   said load-generation means having a first at least one leaf spring section formed in a three-dimensionally bent shape and integral with said load beam, said first at least one leaf spring section being extended from said at least one fixing means in a backward direction such that said at least one fixing means is located between said at least one leaf spring section and said top end section of said load beam.

2. A head gimbal assembly comprising:
a head slider having at least one head element;
a resilient flexure for supporting said head slider to control flying attitude of said head slider;
a load beam, supporting said flexure at a top end section thereof, for applying a load in a direction perpendicular to a surface of a recording medium to said head slider;
at least one fixing means, formed integral with said load beam, for fixing said load beam to a support arm; and
a load-generation means, coupling said at least one fixing means with said load beam, for generating the load,
said load-generation means having a first at least one leaf spring section formed in a three-dimensionally bent shape and integral with said load beam, said first at least one leaf spring section being extended from said at least one fixing means in a backward direction such that said at least one fixing means is located between said at least one leaf spring section and said top end section of said load beam.

3. The head gimbal assembly as claimed in claim 2, wherein said first at least one leaf spring section and said load beam are unitarily formed by a single plate member.

4. The head gimbal assembly as claimed in claim 2, wherein said first at least one leaf spring section is located at the rear of a center of an unsprung mass of said head gimbal assembly except for said head slider.

5. The head gimbal assembly as claimed in claim 2, wherein said first at least one leaf spring section is formed by a single leaf spring section.

6. The head gimbal assembly as claimed in claim 2, wherein said at least one head element comprises at least one thin-film magnetic head.

7. A head arm assembly comprising:
a head slider having at least one head element;
a resilient flexure for supporting said head slider to control flying attitude of said head slider;
a load beam, supporting said flexure at a top end section thereof, for applying a load in a direction perpendicular to a surface of a recording medium to said head slider;
at least one fixing means formed integral with said load beam;
a load-generation means, coupling said at least one fixing means with said load beam, for generating the load;
a high rigidity support arm fixed to said at least one fixing means at its top end section for supporting said load beam; and
a drive means for rotationally moving the support arm in a direction parallel to said surface of the recording medium,
said load-generation means having a first at least one leaf spring section formed in a three-dimensionally bent shape and integral with said load beam, said first at least one leaf spring section being extended from said at least one fixing means in a backward direction such that said at least one fixing means is located between said at least one leaf spring section and said top end section of said load beam.

8. The head arm assembly as claimed in claim 7, wherein said first at least one leaf spring section and said load beam are unitarily formed by a single plate member.

9. The head arm assembly as claimed in claim 7, wherein said first at least one leaf spring section is located at the rear of a center of an unsprung mass of said head arm assembly except for said head slider.

10. The head arm assembly as claimed in claim 7, wherein said first at least one leaf spring section is formed by a single leaf spring section.

11. The head arm assembly as claimed in claim 7, wherein said at least one head element comprises at least one thin-film magnetic head.

12. A head arm assembly comprising:
a head slider having at least one head element;
a resilient flexure for supporting said head slider to control flying attitude of said head slider;
a load beam, supporting said flexure at a top end section thereof, for applying a load in a direction perpendicular to a surface of a recording medium to said head slider;
at least one fixing means formed integral with said load beam;
a load-generation means, coupling said at least one fixing means with said load beam, for generating the load;
a high rigidity support arm fixed to said at least one fixing means at its top end section for supporting said load beam; and
a drive means for rotationally moving the support arm in a direction parallel to said surface of the recording medium,
said load-generation means having a first at least one leaf spring section extended from said at least one fixing means in a backward direction such that said at least one fixing means is located between said at least one leaf spring section and said top end section of said load beam and at the front of a horizontal bearing axis of the support arm, which is driven to rotationally move around the horizontal bearing axis.

13. The head arm assembly as claimed in claim 12, wherein said first at least one leaf spring section and said load beam are unitarily formed by a single plate member.

14. The head arm assembly as claimed in claim 12, wherein said first at least one leaf spring section is located at the rear of a center of an unsprung mass of said head arm assembly except for said head slider.

15. The head arm assembly as claimed in claim 12, wherein said first at least one leaf spring section is formed by a single leaf spring section.

16. The head arm assembly as claimed in claim 12, wherein said at least one head element comprises at least one thin-film magnetic head.

17. A disk drive device including at least one recording medium and at least one head arm assembly that comprises:
a head slider having at least one head element;
a resilient flexure for supporting said head slider to control flying attitude of said head slider;
a load beam, supporting said flexure at a top end section thereof, for applying a load in a direction perpendicular to a surface of a recording medium to said head slider;
at least one fixing means formed integral with said load beam;
a load-generation means, coupling said at least one fixing means with said load beam, for generating the load;
a high rigidity support arm fixed to said at least one fixing means at its top end section for supporting said load beam; and
a drive means for rotationally moving the support arm in a direction parallel to said surface of the recording medium,
said load-generation means having a first at least one leaf spring section formed in a three-dimensionally bent shape and integral with said load beam, said first at least one leaf spring section being extended from said at least one fixing means in a backward direction such that said at least one fixing means is located between said at least one leaf spring section and said top end section of said load beam.

18. A disk drive device including at least one recording medium and at least one head arm assembly that comprises:
   a head slider having at least one head element;
   a resilient flexure for supporting said head slider to control flying attitude of said head slider;
   a load beam, supporting said flexure at a top end section thereof, for applying a load in a direction perpendicular to a surface of a recording medium to said head slider;
   at least one fixing means formed integral with said load beam;
   a load-generation means, coupling said at least one fixing means with said load beam, for generating the load;
   a high rigidity support arm fixed to said at least one fixing means at its top end section for supporting said load beam; and
   a drive means for rotationally moving the support arm in a direction parallel to said surface of the recording medium,
   said load-generation means having a first at least one leaf spring section extended from said at least one fixing means in a backward direction such that said at least one fixing means is located between said at least one leaf spring section and said top end section of said load beam and at the front of a horizontal bearing axis of the support arm, which is driven to rotationally move around the horizontal bearing axis.

* * * * *